United States Patent
Bayrakdar

(10) Patent No.: US 8,967,106 B2
(45) Date of Patent: Mar. 3, 2015

(54) VALVE INSERT, AND VALVE HAVING A VALVE INSERT OF THIS TYPE

(75) Inventor: Ali Bayrakdar, Rothenbach/Pegnitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 65 days.

(21) Appl. No.: 13/809,001

(22) PCT Filed: Jun. 15, 2011

(86) PCT No.: PCT/EP2011/059894
§ 371 (c)(1),
(2), (4) Date: Jan. 8, 2013

(87) PCT Pub. No.: WO2012/007240
PCT Pub. Date: Jan. 19, 2012

(65) Prior Publication Data
US 2013/0112163 A1 May 9, 2013

(30) Foreign Application Priority Data

Jul. 12, 2010 (DE) .......................... 10 2010 026 853

(51) Int. Cl.
*F01L 1/34* (2006.01)
*F01L 1/344* (2006.01)
*F01L 1/46* (2006.01)
*F16K 51/00* (2006.01)

(52) U.S. Cl.
CPC .............. *F01L 1/344* (2013.01); *F01L 1/3442* (2013.01); *F01L 1/46* (2013.01); *F16K 51/00* (2013.01); *F01L 2001/34426* (2013.01); *F01L 2001/34433* (2013.01); *F01L 2001/3444* (2013.01); *F01L 2103/00* (2013.01)
USPC ....................... 123/90.17; 123/90.15; 464/160

(58) Field of Classification Search
CPC . F01L 1/46; F01L 1/3442; F01L 2001/34426; F01L 2001/3444
USPC .............................. 123/90.17, 90.15; 464/160
See application file for complete search history.

(56) References Cited

U.S. PATENT DOCUMENTS

| 6,187,182 | B1 * | 2/2001 | Reynolds et al. | ............. 210/136 |
| 7,389,756 | B2 * | 6/2008 | Hoppe et al. | ............... 123/90.17 |
| 2008/0271689 | A1 | 11/2008 | Konias et al. | |

FOREIGN PATENT DOCUMENTS

| DE | 10128065.3 | 12/2002 |
| DE | 102005028757 | 1/2007 |
| DE | 102008004591 | 7/2009 |
| WO | 0006286 | 2/2000 |
| WO | 2006127347 | 11/2006 |
| WO | 2008025808 | 3/2008 |

* cited by examiner

*Primary Examiner* — Ching Chang
(74) *Attorney, Agent, or Firm* — Volpe and Koenig, P.C.

(57) ABSTRACT

A valve insert (8a, 8b) for a valve, in particular for a control valve (2) for controlling pressure-medium streams of a camshaft adjuster, includes an insert housing (10), in which a filter (12) and a non-return valve (14) with a closing element (24) and a seat element (20) are integrated. A configuration of the valve insert which is easy to install is ensured by at least the insert housing (10), the filter (12) and the seat element (20) being connected non-detachably to one another and forming one preassembled structural unit (40).

9 Claims, 2 Drawing Sheets

VALVE INSERT, AND VALVE HAVING A VALVE INSERT OF THIS TYPE

FIELD OF THE INVENTION

The invention relates to a valve insert for a valve and to a valve with such a valve insert, in particular for a control valve for controlling flows of pressurized medium in a camshaft adjuster.

BACKGROUND

In modern internal combustion engines, devices for variably setting the timing of gas exchange valves, also known as camshaft adjusters, are used to be able to variably change the phase position of a camshaft relative to a crankshaft in a defined range of angles between a maximum advanced position and a maximum retarded position. The cams of the camshafts commonly contact cam followers, for example, bucket tappets, rocker arms, or finger levers. If a camshaft is set in rotation, the cams roll on the cam followers that, in turn, actuate the gas exchange valves. The position and the shape of the cams thus define both the opening period and also the opening magnitude, but also the opening and closing times of the gas exchange valves.

The angular displacement of the camshaft with respect to the crankshaft for achieving optimized timing for different rotational speeds and load states is called camshaft adjustment. One structural variant of a camshaft adjuster operates, for example, according to the so-called oscillating engine principle. Here, a stator and a rotor are provided that lie coaxially and can move relative to each other. The stator and the rotor together form pairs of hydraulic chambers. Each chamber pair is hereby bounded by webs of the stator and divided by each vane of the rotor into two pressure chambers that act against each other and whose volumes are changed in opposite directions by a relative rotational movement of the rotor relative to the stator. In the maximum adjustment position, each vane contacts one of the edge-side webs of the stator. The relative rotational movement of the rotor is realized by an adjustment of the vane in that a hydraulic medium or pressurized medium, such as oil, is introduced by means of pressurized medium channels into one of the pressure chambers of the chamber pair and presses away the vane. The pressurized medium channels open on both sides of each vane, so that the hydraulic medium is guided into the respective pressure chamber.

For controlling flows of pressurized medium for camshaft adjusters, hydraulic control valves in the form of multiple-path gate valves are normally used. As essential components, they comprise a valve housing and a control piston that is held so that it can move in the axial direction in a housing cavity and is activated by an actuator, typically an electromagnet with a tappet.

In one common construction, such control valves are switched as so-called central valves that are used in a central hole of the rotor of a camshaft adjuster. The valve housing of such a central valve is provided with a thread by means of which the valve housing can be screwed into a corresponding threaded hole of the camshaft, in order to connect the rotor to the camshaft in a rotationally locked way. A feed of pressurized medium to the pressurized medium connection and a discharge of pressurized medium from the discharge connection of the control valve are performed through the rotor and the camshaft, respectively. The feed of pressurized medium is performed in the radial direction by means of a feed connection. By means of two work connections on the valve housing, the pressurized medium is introduced alternately into the opposing chambers of a chamber pair. Depending on the position of the control piston, one of the chambers is connected to the feed connection by means of one of the work connections and is filled with the pressurized medium. At the same time, the opposing chamber communicates with a discharge connection on the control valve by means of the work connection allocated to it and is emptied in this way.

When the internal combustion engine is operating, the camshaft can be subjected to changing moments that are transferred via the pressure chambers as pressure shocks to the hydraulic system of the camshaft adjuster. To prevent a forwarding of such pressure shocks, non-return valves that can be unlocked hydraulically are used in the pressurized medium feed of the camshaft adjuster.

A control valve with an integrated, flat non-return valve is described in DE 10 2008 004591. A hollow pressurized medium insert that has an outer diameter adapted to the inner diameter of the housing is inserted in a valve housing of the control valve. The pressurized medium insert comprises a sleeve-shaped insert section with a structural section that is shaped on the housing side and is provided on the end with an axial support ring. The support ring is held within an axial holding collar that is shaped on a seating surface body. The holding collar is bent radially inward on its free end and engages behind the support ring, wherein the three components of the seating surface body, closing element, and pressurized medium insert are fixed in their relative axial position. An end surface of the axial support ring comes into contact with a closing element that contacts, on its side, against a seating surface shaped by the seating surface body. The plate-shaped closing element has a plurality of openings that are constructed such that a central closing part spring-mounted by means of multiple spring tabs is shaped for closing a valve opening. The openings here surround the closing part in a spiral shape. A ring filter is also installed in the pressurized medium line upstream of the non-return valve.

Such a multiple-part construction of the pressurized medium insert, the non-return valve, and the filter leads to increased handling costs and is associated with multiple processing steps in the installation of the individual components of the control valve.

SUMMARY

The invention is based on the objective of constructing the components of a valve in a way that is easy to install and is economical.

The objective is met according to the invention by a valve insert for a valve, in particular, for a control valve for controlling flows of pressurized medium in a camshaft adjuster, comprising an insert housing in which a filter and a non-return valve with a closing element and a seating element are integrated, wherein at least the insert housing, the filter, and the seating element are connected to each other in a non-detachable way and form a preassembled structural unit.

The objective is further met according to the invention by a valve, in particular, by a control valve for controlling flows of pressurized medium in a camshaft adjuster, comprising a hollow valve housing with at least one feed connection and at least one discharge connection, wherein such a valve insert is mounted on the valve housing. The advantages listed below with respect to the valve insert and preferred configurations can be transferred analogously to the valve.

The invention starts from the idea that a simple installation of at least some of the components of a valve and also an economical production of these components are realized by forming the components of a preassembled structural unit that is stored, transported, and installed in the valve as such. The closing element can also be mounted on the valve insert in a non-detachable way. Alternatively, the connection between the closing element and the valve insert could be detachable. The components of the preassembled structural unit can be made both from the same material and also from different materials and are connected to each other in a non-detachable way in a production step of the structural unit. Thus, a complicated, separate installation of the filter and the non-return valve is eliminated in the assembly of the valve. The risk that one of the components becomes detached during operation is also minimized in this way.

The integral valve insert is mounted on the valve housing in the valve configuration. The valve insert is here constructed, in particular, as an external valve insert, i.e., it is not arranged in the interior of the valve housing, but instead it forms an extension of the valve housing. The valve insert is here arranged in the direction of flow of the pressurized medium, in particular, directly after the feed connection, wherein the feed connection is constructed in the insert housing or alternatively in another, front part of the multiple-part valve. The valve insert is here connected to the valve housing preferably with a positive fit or with a non-positive and positive fit. For this connection, several different connection types could be used, e.g., bending, flanging, swaging, or a snap-on connection between the insert housing and the valve housing.

Advantageously, the non-return valve has a flat closing element that covers an opening in the seating element of the non-return valve in a fluid-tight way in a closed position. The flat closing element that has, in particular, a plate-like or disk-like shape, forms a spring element due to its geometry and its material composition. The closing element is here supported against the seating element, wherein the closing element is connected to the seating element at one or more locations so that it is fixed in location. If external forces act on the non-return valve, the closing element is located in the closed position in which it closes the opening. The pressing force of the pressurized medium that flows through the feed connection into the valve insert lifts a free, non-fixed area of the closing element from the seating element. The non-return valve is located in an open position in which the opening is open and the pressurized medium flows through the opening into the interior of the valve. When the direction of the pressurized medium changes, this medium presses the closing element against the seating element again, which closes the opening and prevents a return flow of the pressurized medium. Due to the spring-like properties of the closing element, the non-return valve is automatically closed, even when external forces no longer act on the closing element.

Preferably, the seating element of the non-return valve has a contact surface with openings formed around its periphery. The contact surface is, in particular, a circular end face in which the opening is formed. The material of the filter frame is injection molded on both sides of the contact surface through the openings and is thus connected in a rigid and non-detachable way to the material of the contact surface. According to one preferred variant, a collar is formed around the contact surface. This collar is provided with the openings and is offset axially with respect to the contact surface. Thus, a groove is formed between the contact surface and the insert housing and this groove is filled with the material of a filter frame of the filter up to the height of the contact surface during the production of the valve insert.

Advantageously, the filter frame is an injection molded part that is injection molded around the contact surface through the openings. The filter frame is thus formed on both sides of the contact surface and collar. The filter frame is made, in particular, from plastic. A filter fabric that extends parallel to the plane of the contact surface is stretched in the filter frame.

According to one preferred construction, the contact surface is part of the insert housing, so that the seating element and the insert housing form one component from the same material. Through the integral construction of the seating element and the insert housing, the number of components of the valve insert is further reduced, wherein the production of the valve insert is made easier. The filter frame formed from plastic is here located especially completely in the interior of the insert housing. The contact surface and the insert housing are preferably made from steel, although other materials can also be used. When the valve is installed in a rotor of a camshaft adjuster, a part of the valve housing and the valve insert extend in the interior of the camshaft. The valve insert here contacts against a stop on the inner wall of the camshaft that normally has a sharp edge and offers little contact surface area. For stability reasons, steel is therefore preferred for the insert housing. If the contact surface is somewhat larger, the insert housing could also be made, e.g., from plastic.

According to one alternative preferred construction, the insert housing forms the filter frame for the filter and the seating element of the non-return valve represents a separate component that is integrated into the insert housing during the production of this insert housing. This second construction of the valve insert is advantageous when fewer demands are placed on the mechanical stability of the insert housing, so that this is made from plastic. With respect to a secure insertion of the seating element in the insert housing, the collar is advantageously a Z-shaped collar that is injection molded from the material of the insert housing.

Preferably, tabs for a snap-on connection with the valve are formed on the insert housing. Corresponding receptacles for the tabs are provided on the valve housing. Thus, a secure connection is realized between the valve and the valve insert that can be disconnected when necessary, e.g., to service or replace the insert. The construction of connection elements is especially easy and efficient when the insert housing is made from plastic.

BRIEF DESCRIPTION OF THE DRAWINGS

One embodiment of the invention is explained in more detail with reference to the drawings. Shown herein are.

DETAILED DESCRIPTION OF THE PREFERRED EMBODIMENTS

Figure 1:
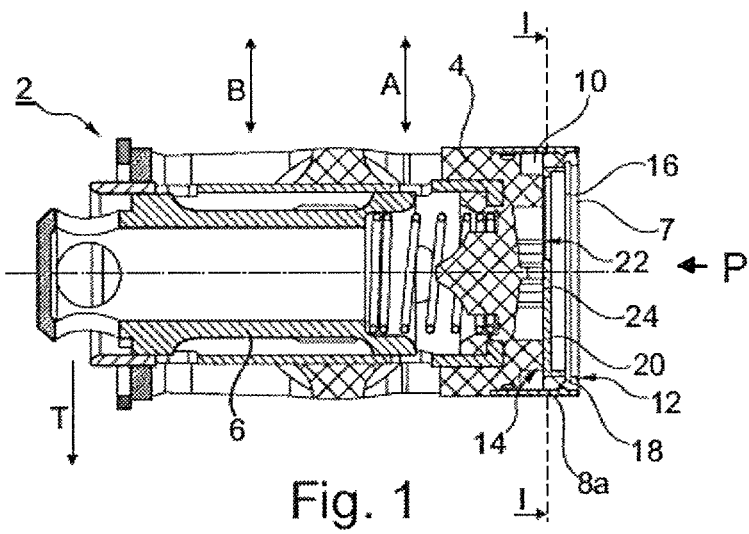
FIG. 1 an axial cross-section view through a control valve with a valve insert according to a first embodiment, FIG. 2 a top view of a non-return valve in the plane I according to FIG. 1, FIG. 3 a top view of a seating element of the non-return valve according to FIG. 2, FIG. 4 in an axial cross-section, an insert housing for a valve insert according to FIG. 1, FIG. 5 in an axial cross-section, the insert housing according to FIG. 4 with an integrated filter, FIG. 6 an axial cross-section view through a control valve with a valve insert according to a second variant, FIG. 7 a top view of a seating element for a non-return valve in the plane II according to FIG. 6, FIG. 8 an axial cross-section through the seating element according to FIG. 7, FIG. 9 an axial cross-section through the valve insert according to FIG. 6, and FIG. 10 another axial cross-section through the valve insert according to FIG. 6.

In FIG. 1, a control valve 2 is shown that is constructed as a central valve and is inserted for use in a central hole of a rotor of a hydraulic camshaft adjuster that is not shown in more detail here. The control valve 2 comprises a hollow, cylindrical valve housing 4 with a feed connection P not shown in more detail here for a pressurized medium, such as oil, wherein a feed direction of the oil is indicated with the arrow P. In the valve housing 4 there are also two work connections A, B for the opposing pressurized medium chambers in the rotor of the camshaft adjuster and also a discharge connection T. Within the valve housing 4, a control piston 6 is guided in the axial direction, wherein, depending on its position, the feed connection P is connected to one of the work connections A, B in terms of flow, while the other work connection A, B is connected to the discharge connection T. In the area of a pressurized medium line 7 between the feed connection P and the work connections A, B there is a valve insert 8a. The valve insert 8a comprises an insert housing 10 in which a filter 12 and a non-return valve 14 are arranged downstream one behind the other. The filter 12 comprises a filter fabric 16 and a filter frame 18 for stretching the filter fabric 16. A cavity for the pressurized medium is formed between the filter fabric 16 and the non-return valve 14. The non-return valve 14 is assembled in the illustrated embodiment from a seating element 20 with an opening 22 for the pressurized medium and a closing element 24. The valve insert 8a is here made from steel and mounted on an outside of the valve housing 4 by flanging or bending. The insert housing 10 thus represents an extension of the valve housing 4, so that the valve insert 8a is an external valve insert.

Figure 2:
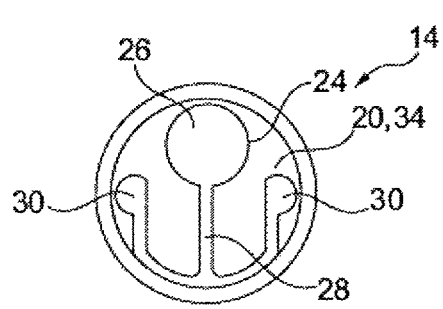
Figure 3:
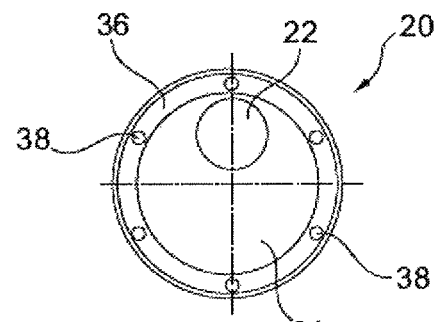
Figure 4:
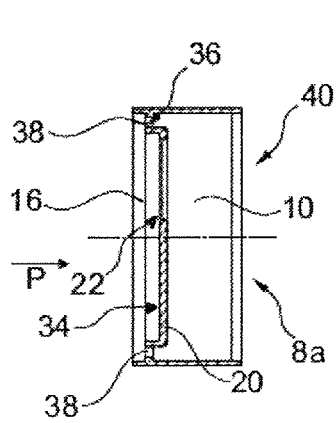
Figure 5:
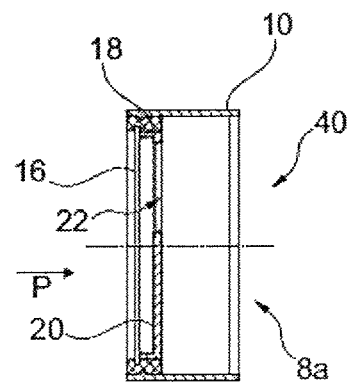

The detailed construction of the axially flat non-return valve 14 can be seen from FIGS. 2 and 3. The closing element 24 is made from spring steel. The closing element 10 comprises three functional areas: a closing plate 26 for the closing of the opening 22 in the seating element 20, a spring-like bending web 28, and two fixing arms 30a for fixing the closing element 24 on the seating element 20. The shape of the fixing arms 30 follows the contours of the seating element 20, so that the fixing arms 30 have arc-like shapes in the illustrated embodiment.

The seating element 20 has a contact surface 32 on which the closing element 24 lies in a closed position of the non-return valve 14 and here covers the opening 22. The shape of the closing plate 26 is adapted to the shape of the opening 22.

The pressurized medium that is introduced into the control valve 2 through the work connection P is led into the pressurized medium line 7 and passes through the filter 12. Under the pressing force of the pressurized medium, the closing plate 26 lifts from the seating element 20, so that the opening 22 is opened and the pressurized medium can flow in the direction of the work connections A, B.

In the event of a pressure shock against the direction of flow or a return flow of the pressurized medium, the closing plate 26 of the non-return valve 14 is pressed against the contact surface 32, so that the opening 22 is closed and a further return flow of the pressurized medium through the opening 22 is prevented.

In the illustrated embodiment, the contact surface 34 is made from steel and is formed integrally with the insert housing 10. The insert housing 10 thus forms the seating element 20 for the non-return valve 14. A collar 36 with an L-shaped form seen in its axial section is formed around the contact surface 34. This collar is provided with openings 38. The openings 38 are used for the injection molding of a plastic from which the filter frame 18 is formed. The seating element 20 and the filter fabric 16 are here injection molded with the material of the filter frame 18. Because the filter frame 18 is an injection molded part that extends on both sides of the L-shaped collar 36 and therefore is connected in a non-detachable way to the insert housing 10, the insert housing 10, the filter frame 18, the filter fabric 16, and the seating element 20 of the non-return valve 14 form one structural unit that cannot be disassembled. The preassembled structural unit 40 is completed by mounting the closing element 24 on the seating element 20. The structural unit 40 is then coupled in this form onto the valve housing 4.

Figure 6:
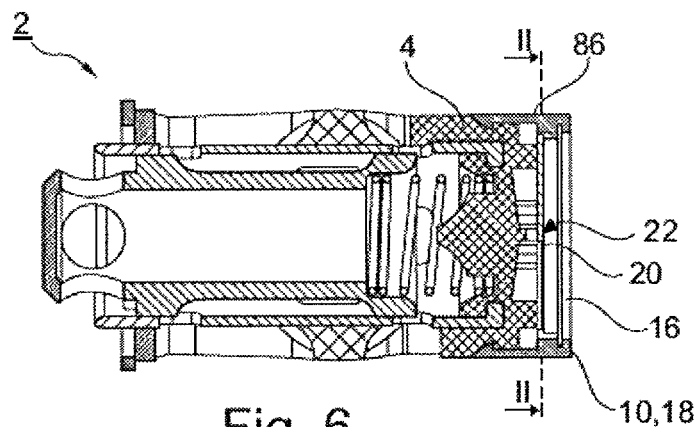
Figure 7:
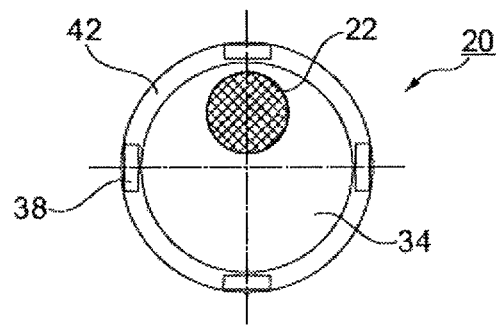
Figure 8:
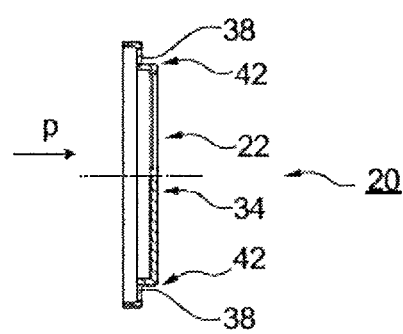

Another control valve 2 with a valve insert 8b according to a second variant can be seen from FIG. 6. The valve insert 8b with a construction that is shown in FIGS. 7 to 10 differs from the valve insert 8a according to the preceding embodiment in that the insert housing 10 is made from the material of the filter frame 18 and thus is made from plastic. The seating element 20 is formed as a separate component that is injection molded with the material of the insert housing 10 or the filter frame 18 during the production of the insert housing 10. The seating element 20 can be made from steel or also from other materials, such as plastic.

Figure 10:
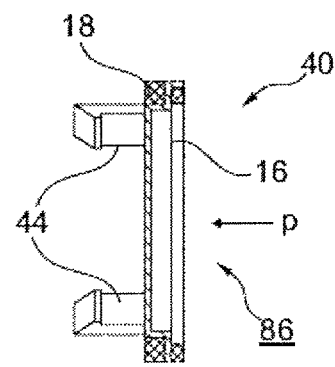

In this embodiment, the seating element 20 has a Z-shaped collar 42 that is completely surrounded by the material of the filter frame 18 in the assembled state of the valve insert 8b (see FIG. 10). The Z-shaped collar 42 is also provided with openings 38 for the material of the filter frame 18.

For attaching the valve insert 8 onto the valve housing 4, there are tabs 44 that are used to produce a snap-on connection to the valve housing 4.

Figure 9:
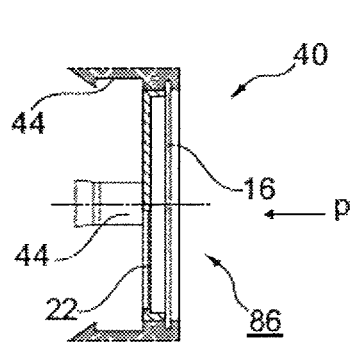

In FIGS. 9 and 10, the preassembled structural unit 40 is shown that comprises, in this case, the insert housing 10 with the tab 44 that is simultaneously the filter frame 18, the filter fabric 16, and the seating element 20. The valve insert 8b is also completed here by the mounting of a closing element 24 on the seating element 20 or on the insert housing 10 for closing the opening 22.

The valve inserts 8a, 8b are characterized in that, due to the integral construction of the preassembled structural unit 40, the assembly of both the non-return valve 14 and also the filter 12 in the control valve 2 is especially simple. If one of these components 12, 14 is damaged, the valve insert 8a, 8b can be easily replaced.

LIST OF REFERENCE NUMBERS

2 Valve
4 Valve housing
6 Control piston
7 Pressurized medium line
8a, 8b Valve insert
10 Insert housing
12 Filter
14 Non-return valve
16 Filter fabric
18 Filter frame
20 Seat element
22 Opening
24 Closing element
26 Closing plate
28 Bending web
30 Fixing arm
32 Contact surface 34 Contact surface
36 L-shaped collar
38 Opening
40 Structural unit
42 Z-shaped collar
44 Clip
A, B Work connections
P Feed connection
T Discharge connection

The invention claimed is:

1. A valve insert for a valve, comprising an insert housing in which a filter and also a non-return valve are integrated with a closing element and a seat element, wherein at least the insert housing, the filter and the seat element are connected to each other in a non-detachable way and form a preassembled structural unit, wherein the seat element has a contact surface, and openings are formed around a periphery of the contact surface, and a collar with the openings is constructed around the contact surface.

2. The valve insert according to claim 1, wherein the closing element has a flat construction and covers an opening in the seat element in a fluid-tight way in a closed position.

3. The valve insert according to claim 1, wherein a filter frame of the filter is injection molded around the contact surface.

4. The valve insert according to claim 1, wherein the contact surface is part of the insert housing.

5. The valve insert according to claim 3, wherein the insert housing forms the filter frame.

6. The valve insert according to claim 5, wherein the collar is a Z-shaped collar that is injection molded from a material of the insert housing.

7. The valve insert according to claim 1, wherein clips for a snap-on connection to the valve are formed on the insert housing.

8. A valve, comprising a valve housing with a hollow construction and with at least one feed connection (P) and at least one discharge connection (T), and a valve insert according to claim 1 is mounted on the valve housing.

9. The valve of claim 8, wherein the valve is a control valve for controlling flows of pressurized medium in a camshaft adjuster.

* * * * *